United States Patent [19]
Araujo et al.

[11] Patent Number: 5,654,961
[45] Date of Patent: Aug. 5, 1997

[54] ROUTING SYSTEM AND METHOD FOR A TELECONFERENCING SYSTEM

[75] Inventors: Kenneth Araujo, Long Branch; Rajiv Bhatia, Marlboro; Michael Harmon, Jackson; Roderick Randall, Oceanport, all of N.J.; Siuling Zhang, Stony Brook, N.Y.

[73] Assignee: Madge Networks (New Jersey) Inc., Eatontown, N.J.

[21] Appl. No.: 447,121

[22] Filed: May 22, 1995

[51] Int. Cl.$^6$ ............................... H04J 3/12; H04M 3/42
[52] U.S. Cl. ........................ 370/263; 348/15; 379/202; 379/211; 370/522
[58] Field of Search ........................... 370/54, 58.1, 58.2, 370/58.3, 60, 62, 68.1, 79, 110.1; 379/93, 94, 96, 201, 202, 204, 205, 206, 269, 280, 284, 211, 212, 220, 271, 272; 348/13, 14, 15, 16

[56] References Cited

U.S. PATENT DOCUMENTS

| | | | |
|---|---|---|---|
| 4,112,258 | 9/1978 | Alles | 370/62 |
| 4,720,850 | 1/1988 | Oberlander et al. | 379/201 |
| 5,195,086 | 3/1993 | Baumgartner et al. | 370/62 |
| 5,390,241 | 2/1995 | Bales et al. | 379/207 |

*Primary Examiner*—Alpus H. Hsu
*Attorney, Agent, or Firm*—Hale and Dorr

[57] ABSTRACT

In a networked videoconferencing system, a receiver with a number of receiving stations receives calls from a number of different calling stations. To get appropriate bandwidth, two calls are connected at the same time from the calling station to one of the receiving stations. The receiver includes an access switch that uses information from the calling station to pair calls together so that two calls from one calling station are routed to the same receiving station, regardless of the order in which the calls are received by the access switch. The access switch can use one or a combination of routing methods including storing all pairs of incoming numbers in a table and/or by using comparisons of similar numbers.

29 Claims, 7 Drawing Sheets

5,654,961

ROUTING SYSTEM AND METHOD FOR A TELECONFERENCING SYSTEM

FILED OF INVENTION

This invention relates to a routing process for a videoconferencing system.

BACKGROUND OF THE INVENTION

Most current videoconferencing systems have shared resources in conference rooms to allow room-to-room video communication among groups of people. Recently, however desktop videoconferencing systems have emerged as an alternative. These desktop systems allow people to communicate with video calls on an individual basis, and are typically implemented on personal computers (PC's) that can also be used to run other applications, such as word processing or spreadsheets.

Many current desktop systems are interconnected through an integrated services digital network (ISDN) with basic rate interface (BRI) lines. A BRI line has two independent B-channels, each of which can carry data at rates of about 64 kb/sec; and a D-channel, which carries signaling information, such as a called directory number, a calling directory number, and the rate of the call. A caller's directory number, which is given by a telephone service provider, is also called an automatic number identification (ANI).

A videoconferencing calling station, such as a PC-based desktop system, includes at least a microphone and a camera for picking up voice and video signals, and a speaker and a monitor for transmitting voice and video signals. To improve the quality of these transmissions by increasing the bandwidth, the voice and video signals are split up and are transmitted over the two separate B-channels with two telephone calls. The caller enters two telephone numbers to initiate two calls, which are routed through different paths in the ISDN to a receiving station. The receiving station receives signals over the two B-channels, combines them, and provides the video signals on the monitor and voice signals over the speaker.

Because there are two channels and two calls, each calling station has one or two ANI's associated with it (and not with any other calling station). These two ANI's may be the same number or different numbers for each channel, depending primarily on how the telephone system and switching network are configured by the telephone service provider.

One application for desktop videoconferencing technology is for customer service. Customers needing service make video calls to agents in a customer service office. The calls are delivered from a customer's calling station over BRI lines to the ISDN, which switches the calls to the service providing company over a primary rate interface (PRI) line. A PRI line has a D-channel to carry signaling information, and has a relatively large number of B-channels compared to a BRI line.

At the customer service office, a resident access switch receives the calls over the PRI line and switches them over BRI lines to the customer service agents, each of whom has a receiving station, preferably implemented as a PC-based desktop system. On the incoming side, the access switch demultiplexes calls that are routed over individual BRI lines to the agents, and on the outgoing side, the access switch multiplexes calls from the agents to the PRI line. The PRI line thus serves as a trunk between the access switch and the ISDN. The access switch has port interfaces to the BRI lines to implement network protocols such that the access switch is transparent to the parties, i.e., the desktop systems appear to be connected directly to the telephone network.

The access switch receives calls based on a called directory number (CDN) and associates calls with this CDN to one of a number of separate receiving stations. The access switch can receive calls with a number of different CDN's and route them to different corresponding groups of receiving stations. To route the calls, the access switch uses a hunting process to find a receiving station having a free B-channel, and routes the call to the interface associated with that receiving station. This conventional hunting process can work in one of several different ways; e.g., it can be based on the longest idle agent or based on a set queue in which stations are taken in order. In a system in which two calls are transmitted, the calls are paired and routed to an agent in the order received.

Such hunting processes may not always work in a customer service application in which multiple calls are provided, however, especially as the use of desktop videoconferencing grows. If two calls are initiated from each of two different calling stations at about the same time, four calls are routed over different paths of the ISDN. If the calls arrive at the access switch such that a first call from the first calling station is followed by a first call from the second calling station, followed by the respective second calls, both first calls would be routed to a first agent, and after these calls are connected, both second calls would be routed to a second agent. Consequently, each party would receive incomprehensible video and voice information.

SUMMARY OF THE INVENTION

The present invention includes a method and a system for use in videoconferencing systems for appropriately routing calls from one of a number of calling stations to a receiver having a number of receiving stations. The receiver includes an access switch that routes first and second incoming calls intended for the same receiving station such that the first and second calls reach the appropriate receiving station regardless of the order in which calls from different calling stations are received by the access switch. The routing system and method are preferably implemented with a combination of hardware and software in the access switch.

In one aspect, the invention is a method for routing calls in a videoconferencing system that has a plurality of calling stations coupled through a network to a receiver that has an access switch and a plurality of receiving stations. When the access switch receives a call from a calling station, it determines whether there is an existing call from that calling station to any of the receiving stations. If there is such an existing call to a receiving station, the access switch routes the received call to that same receiving station. If there is no existing call from that calling station to any receiving station, the access switch routes the cell to a receiving station, after determining that the receiving station has at least two free channels.

The calling station preferably provides information about its identity to the access switch by transmitting this information over a signal information line as one of a first and second identification number based on a numbered telephone line. Because at least two calls are made over two channels, the two identification numbers can be the same or different. The identification numbers for each separate calling station are uniquely associated with each other and with a particular calling station.

In a first embodiment, to determine whether there is an existing call routed from the same calling station as the received call, the access switch receives from a calling station a call with a first identification number and accesses a table of associated numbers to determine an associated second identification number for the calling station based on the first identification number. The access switch then accesses a second table to determine whether an existing call that has the second identification number is connected. If the first identification number is not in the table of associated numbers, the access switch assumes that the two numbers from the calling station are the same, and proceeds to access the second table to determine if an existing call has the same identification number. If there is such an existing call to a receiving station, the switch routes the received call to that receiving station; otherwise, the switch routes the received call to a receiving station with two free channels.

In a second embodiment, the receiver has different directory numbers for first and second calls. Unlike the first embodiment, the order of calls is important. If the access switch determines that a received call is a first call, it routes the call to a receiving station having two free channels. If the received call is a second call, the access switch uses a numerical comparison to route it to a receiving station having an existing, connected first call that has an identification number that is closest to an identification number of the received call.

In a third embodiment, the access switch is similar to that in the second embodiment, but it requires a certain similarity to pair calls, even if there is only one existing first call, and it also maintains a non-match of similar, but not paired, numbers (a "false positive" table).

In a fourth embodiment, the first and second calls are not distinguished with different directory numbers. The access switch connects the received call to a receiving station if it has one existing call with an identification number that is sufficiently close to the received call.

In a fifth embodiment, the process is similar to that in the third embodiment, except that calls need not be received in any particular order. The matches are made as close as possible within a tolerance, and both match and non-match tables can optionally be built.

In embodiments with comparison steps, the comparing can be employed instead of, or in addition to, accessing a table of associated identification numbers. If such a table is used, it is preferably accessed before resorting to a comparison to determine a best match. If the identification number is not in the table and the access switch routes the call based on the comparison, the access switch can then store in the table pairs of identification numbers found by the comparison. This storing ability allows the system to "learn" the pairs of numbers and to use the learned information to build the table. Building the table allows the access switch to avoid the need to make a best match each time. Without such a table, a best match comparison can be made every time a second call is received.

The table can be built in one of several different ways. To help prevent incorrect pairs of numbers from being entered on the table of associated pairs, the access switch preferably waits until after the calls are cleared to determine whether the calls have been connected for a minimum time. This test relies on an assumption that misrouted calls are quickly disconnected, but successful calls stay connected for some time.

The table can be built by further requiring that the identification numbers of the paired calls be sufficiently close within a defined tolerance. Such a system, however, risks creating too many entries, and thus causing more memory and searching time. Such table-building might be useful with a service having limited access or distribution.

Another way to build the table is to require that the numbers be sufficiently different. This method assumes that if the numbers are close enough, the comparison detects the similarity. During low traffic times or when there is only one first call, calls that might not otherwise be paired may be paired anyway, and such pairing may be correct. During higher traffic times, however, if the numbers are different, the comparison may not detect that the two calls are from the same calling stations. Accordingly, the table is only used for calls that are different enough that under some circumstances, they might not otherwise be paired. If such different numbers are known in advance, they would be added to the table by the administrator.

The ability to learn is particularly useful if the service provider does not receive calls exclusively from videoconferencing systems that it sets up, but rather takes incoming calls without knowing pairs of identification numbers in advance.

The access switch can receive calls that are directed to one of a number of different called directory numbers. Some calls directed to called directory numbers may need to be associated with another call from the same calling station, some may not require such association, and some may be dedicated to particular interfaces. Consequently, the switch first checks the called directory number of the received call to determine whether the switch should route to a receiving station (a) by using the calling directory number; (b) in a conventional manner without regard for the calling directory number; or (c) according to a dedicated individual interface. This determination about the method to be used is preferably made by accessing a table that has a field for called directory numbers, a field for an associated hunting method (if applicable), and a field that lists interfaces for use with that directory number.

In another aspect, the invention is a videoconferencing system that has a plurality of calling stations coupled through a switching network to a receiver. The receiver has a plurality of receiving stations and an access switch for receiving calls from the network and for routing those calls to an appropriate receiving station. The switching system has a processor, responsive to a call received from a calling station, for determining whether an existing call was routed from that calling station to one of the receiving stations, and a switch for switching the received call to that one receiving station if there is an existing call, and for switching the received call to a receiving station with at least two free channels if there is no existing call.

In a preferred embodiment, the access switch has a storage element with a number of stored tables that can be accessed by the processor of the access switch. One table stores called directory numbers, a routing method, and a list of interfaces to which the call can be routed; another table stores pairs of associated identification numbers from the same calling station so that the processor can determine which second identification number to look for; and another table stores information indicating which interfaces are currently connected and identification numbers of the calling stations so that the processor can determine whether the second identification number is for a connected call. The table of associated pairs can be configured by an administrator of the system if the pairs are known, and/or can optionally be formed by the access switch itself through a learning process based on successful matches.

The processor includes means for comparing an identification number for a received call to identification numbers for existing calls. The table can be replaced or supplemented by such means for comparing identification numbers for received calls and for using a best match to switch calls to a desired receiving station.

One application for such a system is for customer service. In this case, the calling stations can be set up by the customer service provider as video kiosks. In this case, the provider knows all the lines in advance. Instead of, or in addition to, such kiosks, a provider could take calls from unknown sources, e.g., from individuals at home with the appropriate two lines and the appropriate hardware and software.

While the method and system are generally described for use with PC-based desktop systems and in customer service applications, they can be used with any type of videoconferencing system and for other applications. While two calls are described as being used at the same time, the principles of the present invention can be expanded to accommodate more than two simultaneous calls. The terms "calling station" and "receiving station" are used here for reference; receiving stations can also be used to make calls, and calling stations can receive calls (unless dedicated for outgoing calls only).

The present invention provides a convenient, flexible, and adaptive method for correctly routing multiple calls in a videoconferencing system, without requiring substantial hardware or software changes. Other feature and advantages will become apparent from the following detailed description, when read in conjunction with the drawings, and from the appended claims.

DETAILED DESCRIPTION

Figure 1:
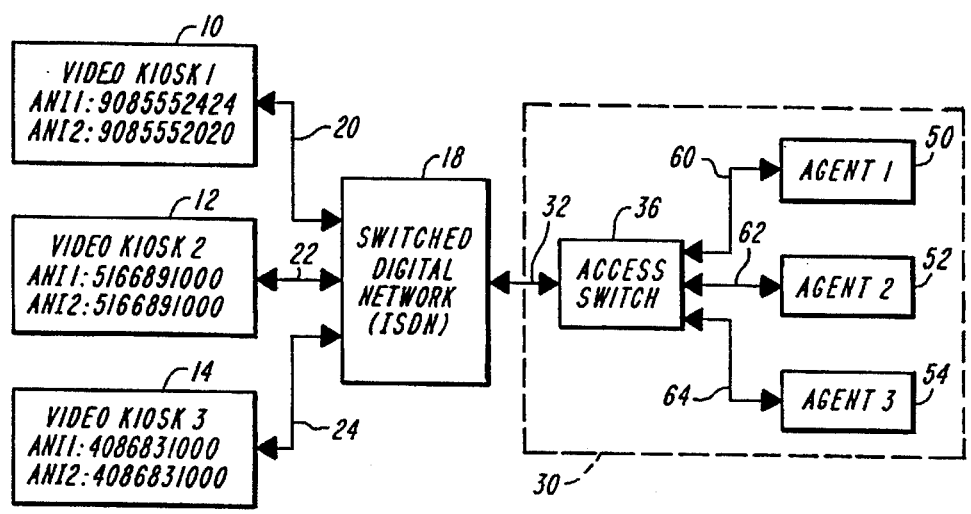
FIG. 1 is a block diagram of a videoconferencing system of the present invention.
Figure 2:
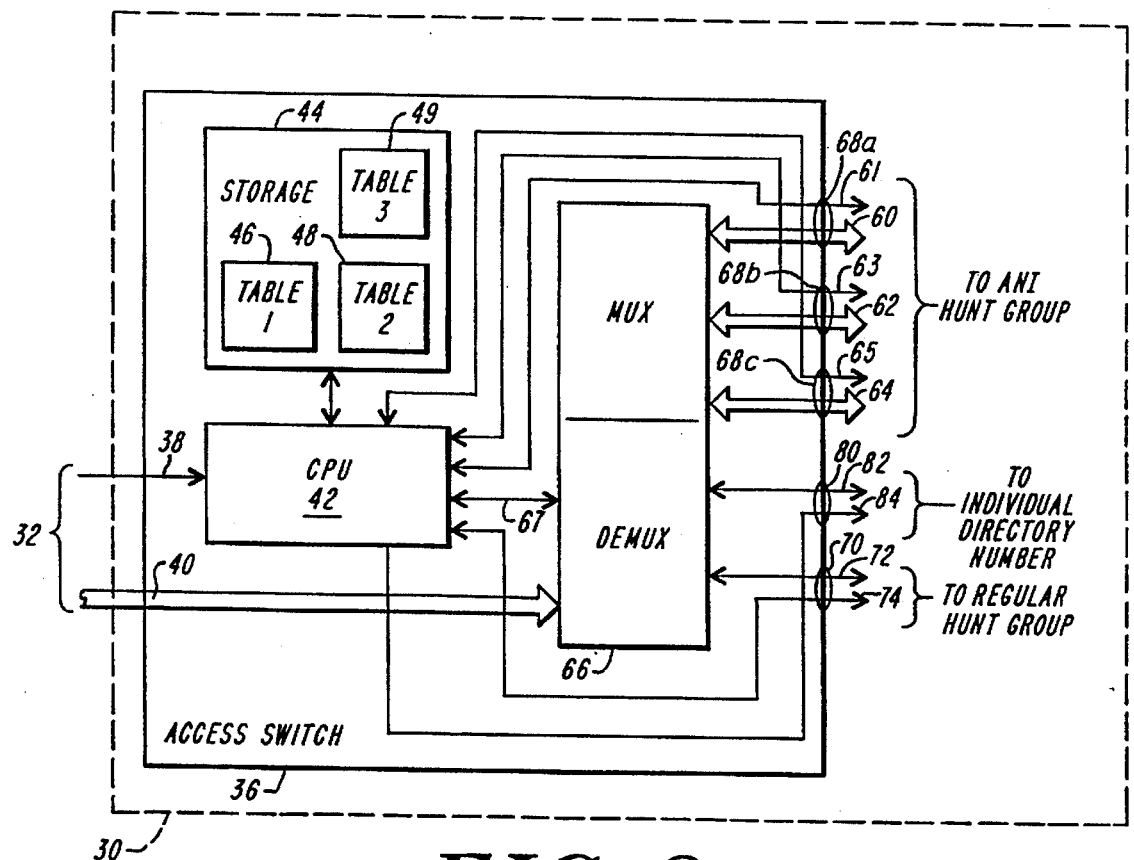
FIG. 2 is a block diagram of an access switch according to the present invention.

Referring to FIGS. 1 and 2, calling stations 10, 12, and 14 (set up, for example, in Video Kiosks 1, 2, and 3) are coupled over BRI lines 20, 22, and 24, respectively, to a switched digital network (ISDN) 18, which switches the calls to a receiver 30 over a PRI line 32. Each of the BRI lines has a plurality of B-channels, preferably two B-channels per calling station, for transmitting voice and/or video signals; and a D-channel for transmitting signal information, including information about the calling directory number, and the called directory number.

For each of the two B-channels on BRI line 20, a calling station has an automatic number identification (ANI) that is determined by the telephone service provider. Pairs of ANI's for the two B-channels for each calling station can be the same or different. For example, from station 10, a first call over a first channel has an ANI of 9085552424, while a second call over a second channel has an ANI of 9085552020. For station 12, BRI line 22 is configured so that each B-channel call has the same ANI.

Each calling station is preferably a PC-based system including at least a CPU with implementing software, a monitor, a speaker, a microphone, and a camera (although in a dedicated system, a powerful PC may be unnecessary and replaced with dedicated components). The software preferably is user-friendly so that, for example, a customer need only select an icon or a function key to make multiple calls. Accordingly, the need for making and connecting multiple calls for high quality voice and video is transparent to the user. The calling stations can be put in kiosks that are arranged all in one building, at different locations in one city, or in a nationwide or worldwide system.

ISDN 18 receives calls made by a user over BRI lines 20, 22, and 24, and routes these calls to receiver 30 over PRI line 32, which has a D-channel line 38 and a plurality of B-channel lines 40. Receiver 30 has an access switch 36 that receives the calls over PRI line 32 and routes the calls to receiving stations 50, 52, and 54 (such as customer service agents 1, 2, and 3) over BRI lines with B-channels 60, 62, and 64, and D-channels 61, 63, and 65.

Access switch 36 has a CPU 42 that controls the routing process according to software that implements processes to route calls. The CPU receives signal information including the calling and called directory numbers over D-channel 38 of the PRI and provides signalling information over the D-channels of the BRI's; the CPU also controls mux/demux 66 over control line 67 to route B-channel 40 of the PRI to the B-channels of the BRI's. A call is routed to (and also from) one of the receiving stations through one of the port interfaces 68a–68c, 70, and 80, depending on the called directory number. Accordingly, B-channel lines 60, 62, 64, 72, and 82 are switched through mux/demux 66, while D-channel lines 61, 63, 65, 74, and 84 are routed directly from CPU 42.

Access switch 36 has a storage element 44, such as a RAM, that stores a number of tables that are accessed by the CPU. One table 48 stores directory numbers, routing methods, and interfaces. This table allows the switch to distinguish between incoming calls to Regular Hunt Directory Numbers (RHDN's), ANI Hunt Directory Numbers (ANI Hunt DN's), and individual directory numbers (IDN's). Each called directory number, whether an RHDN, an ANI Hunt DN, or an IDN is associated in the table with a routing method (or there is a default method) and with a list of the interfaces associated with the called DN.

Calls to IDN's can be routed directly to an interface indicated by table 48. For example, if a certain DN has only one interface 80, this fact can be indicated in table 48 so that the call is routed over B-channel 82 and D-channel 84 without the need to decide among different interfaces (although the switch should make sure that interface 80 is available).

Incoming calls to an RHDN are routed by the access switch based on the called directory number, and without regard to the calling DN. This method for routing can operate on a sequential basis, i.e., to the first interface in a queue with a free B-channel; or on a uniform basis, i.e., to an interface that has been idle for the longest time. While only one interface 70 is shown, there would typically be at least two (otherwise the DN would effectively be an IDN).

Incoming calls to an ANI Hunt DN received over the PRI line, are routed to interfaces 68a–68c based on both the called directory number and the ANI of the incoming call, as is discussed in detail below.

Another table 46, which is used for routing ANI Hunt DN's, has fields for associated pairs of ANI's corresponding to each calling station; for example, table 46 has entries indicating that 9085552424 and 9085552020 are an associated pair of ANI's for calling station 10. When switch 36 receives an incoming call from ISDN 18, D-channel 38 carries the ANI for the incoming call. CPU 42 accesses table 46 to determine the associated ANI that is used by the originating calling station.

If a calling station 12 has identical ANI's, they can also be stored in table 46 as an associated pair. Preferably, however, access switch 36 is configured so that pairs of identical ANI's are omitted from the table; in this case, the access switch assumes that if a call is received and its ANI is not in table 46, an associated ANI is identical to the ANI of the received call. This feature reduces the amount of configuration that must otherwise be performed by an administrator of access switch 36.

When a call is routed to one of port interfaces 68, CPU 42 stores the ANI of the existing routed call and a number identifying the interface in a table 49. When determining where to route, the CPU accesses table 49 with the associated ANI derived from table 46 (or assumed to be identical to the ANI of the received call) to determine whether there is an existing call with that ANI. The CPU then uses this information to route the received call.

Figure 3:
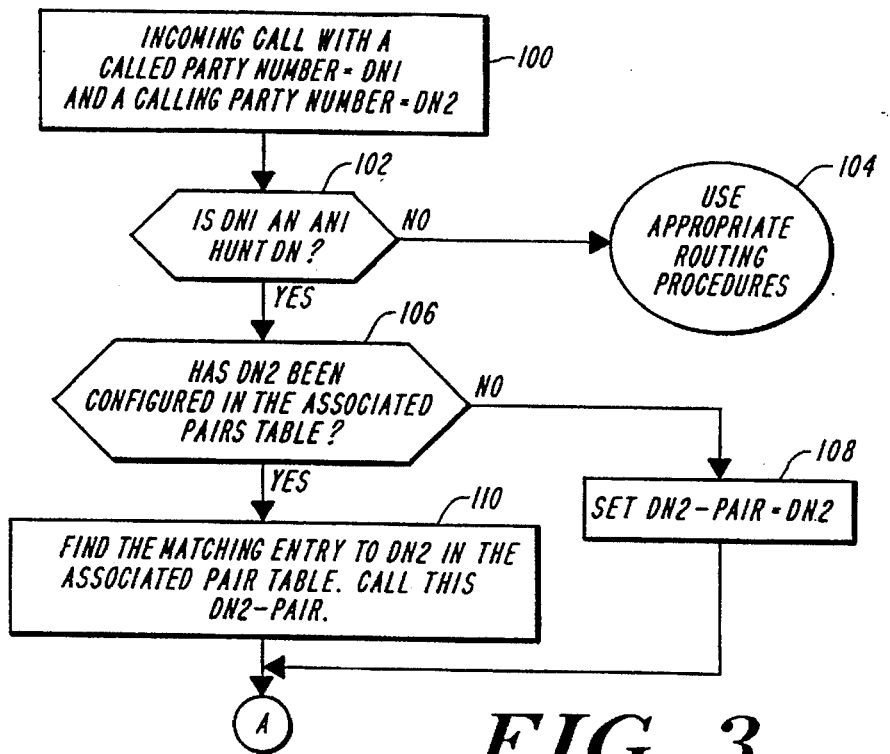
FIGS. 3 and 4 are flow charts illustrating a routing process according to a first embodiment of the present invention.
Figure 4:
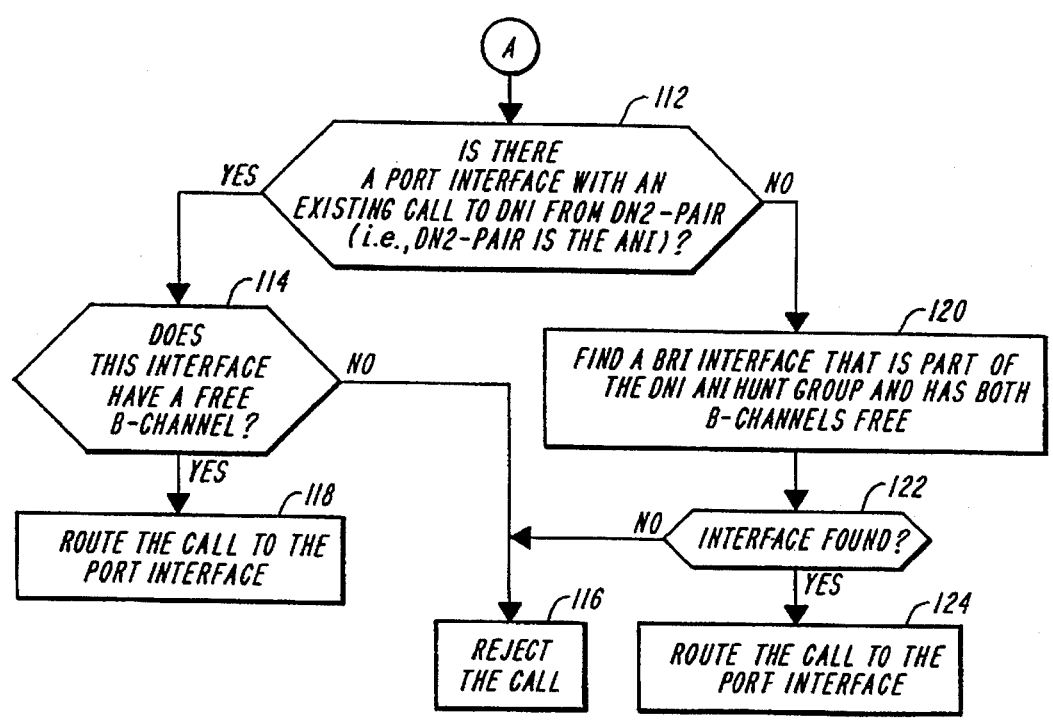

In a first embodiment, a process undertaken by the access switch on receipt of an ANI Hunt DN is illustrated in the flow charts of FIGS. 3–4. Referring particularly to FIG. 3, on receiving an incoming call with a called directory number DN1 and a calling directory number DN2 (an ANI) (step 100), the access switch first determines from table 48 whether called directory number DN1 is an ANI Hunt Directory Number (step 102). If DN1 is not an ANI Hunt DN, it can be a Regular Hunt Directory Number or an individual DN, and appropriate routing procedures are employed for that type of DN (step 104).

To illustrate the difference between different hunting methods by an example, assume a mortgage company (receiver) has a directory number 800-MORTGAG for videoconferenced customer service, and a separate directory number 800-APPLICA for potential customers to request applications over a data line that only requires one channel. Referring also to FIG. 2, if the receiver gets a call with directory number 800-APPLICA, the access switch need only direct the call using regular hunt methods, i.e., to the next receiving station in a queue or based on the longest idle station, without regard to the calling directory number. In this case, it uses port interface 70 to route the call over a single B-channel on B-channel line 72 and D-channel line 74 (line 72 has two channels, but only one is used). Two such data calls can be routed to the same interface. Another called directory number, 800-VYSPRES can be a dedicated, individual directory number that goes to the vice president for customer services. Calls to that directory number are routed to a particular interface 80 indicated by table 48 over D-channel 84 and B-channel 82. If the received call was to 800-MORTGAG, the access switch determines from table 48 that the ANI hunting process is needed, and that the call is routed through one of port interfaces 68a–68c.

If called directory number DN1 is an ANI Hunt DN, the access switch knows from table 48 that there are three interfaces 68a–68c (although many more than three can be used). The access switch next determines whether calling directory number DN2, an ANI, has been configured in the associated pairs table 46 (step 106). If DN2 is not in table 46, the access switch assumes that DN2 is one of an identical pair of ANI's, and sets an associated ANI, DN2-pair, as being equal to DN2 (step 108). If DN2 and a matching entry are in table 46, this matching entry is identified as DN2-pair (step 110). DN2-pair thus represents an ANI for another channel from the originating calling station and is used to check for an existing call.

Referring to FIG. 4, the access switch next determines how to route the incoming call. The CPU accesses table 49 or some other information to determine whether there is an existing call to DN1 with an ANI of DN2-pair (step 112), i.e., whether the calling station's other ANI is currently connected to a receiving station. If there is such an existing call, the switch determines whether there is a free B-channel to that receiving station (step 114). If there is no free B-channel, the call is rejected (step 116); if there is a free B-channel, the call is routed to the port interface for the BRI line to that receiving station (step 118). In the latter case, the two calls from one calling station are both connected to one receiving station.

If there is no existing call though a port interface to a receiving station from DN2-pair, the switch finds a port interface that has both B-channels free (step 120, 122). If no such interface is found, the call is rejected (step 116); if there is an interface with two free channels, the call is routed to that interface (step 124). This call is therefore a first call from a calling station, so it is likely that steps 112, 114, and 118 will follow shortly. The search for a free interface in step 120 can be made serially, or based on the longest idle interface. In this respect, step 120 is similar to "regular" hunting methods.

For example, if the access switch receives a call initiated with a called directory number (DN1) 800-MORTGAG and an ANI (DN2) 9085552020, the access switch first determines from table 48 that 800-MORTGAG is an ANI Hunt DN and that it can be routed to one of interfaces 68a–68c. The access switch determines from table 46 that there is an associated ANI (DN2-pair) 9085552424, and then determines from table 49 whether one of port interfaces 68a–68c has an existing call with the associated ANI. If such a call exists, the call is switched to that interface. If it does not find such an interface, the access switch assumes that the new call is the first in a pair of calls, and delivers the call to an idle port interface having two free channels.

If a call comes into the access switch with a called directory number 800-MORTGAG and an ANI 5166891000, the access switch does not find an ANI 5166891000 in table 46. Therefore, it checks table 49 for an existing call over one of interfaces 68a–68c with the same ANI. If such a call exists, the received call is routed over the interface to the same receiving station; if it does not exist, the access switch assumes that the new call is the first of a paired set of calls, and delivers the call to an idle interface.

Rather than using dedicated kiosks configured by a service provider, customers may purchase desktop videoconferencing systems or packages for upgrading personal computers with appropriate hardware and software. If a service provider takes calls from such individuals, the ANI's associated with these individuals may not be known in advance to the service provider, such as a product manufacturer. Consequently, not all the pairs of associated ANI's can be configured in table 46; rather, there will be unknown pairs.

Another application for desktop videoconferencing that could use such video calls would be a server that offers software updates. A customer dials into an appropriate number and is connected to a video server through two B-channels. In response to prompts to the customer, the server performs the software update.

For cases in which the ANI is identical, the access switch can first check for another call with the same ANI. Otherwise, a process is provided for routing multiple calls originating from a single calling station with ANI's that are different and are not configured in a table in the access switch.

In this second embodiment, the process first differentiates between first calls and second calls originating from the desktop system. By differentiating such calls, the access switch does not attempt to route two first calls or two second calls from different calling stations to the same receiving station. An associated pairs table is optional, but if one is used, the process preferably includes a "learning" feature so that if associated ANI's are found that are sufficiently similar or different (depending on the embodiment), these ANI's can be learned and automatically stored in a table, such as table 46.

Figure 5:
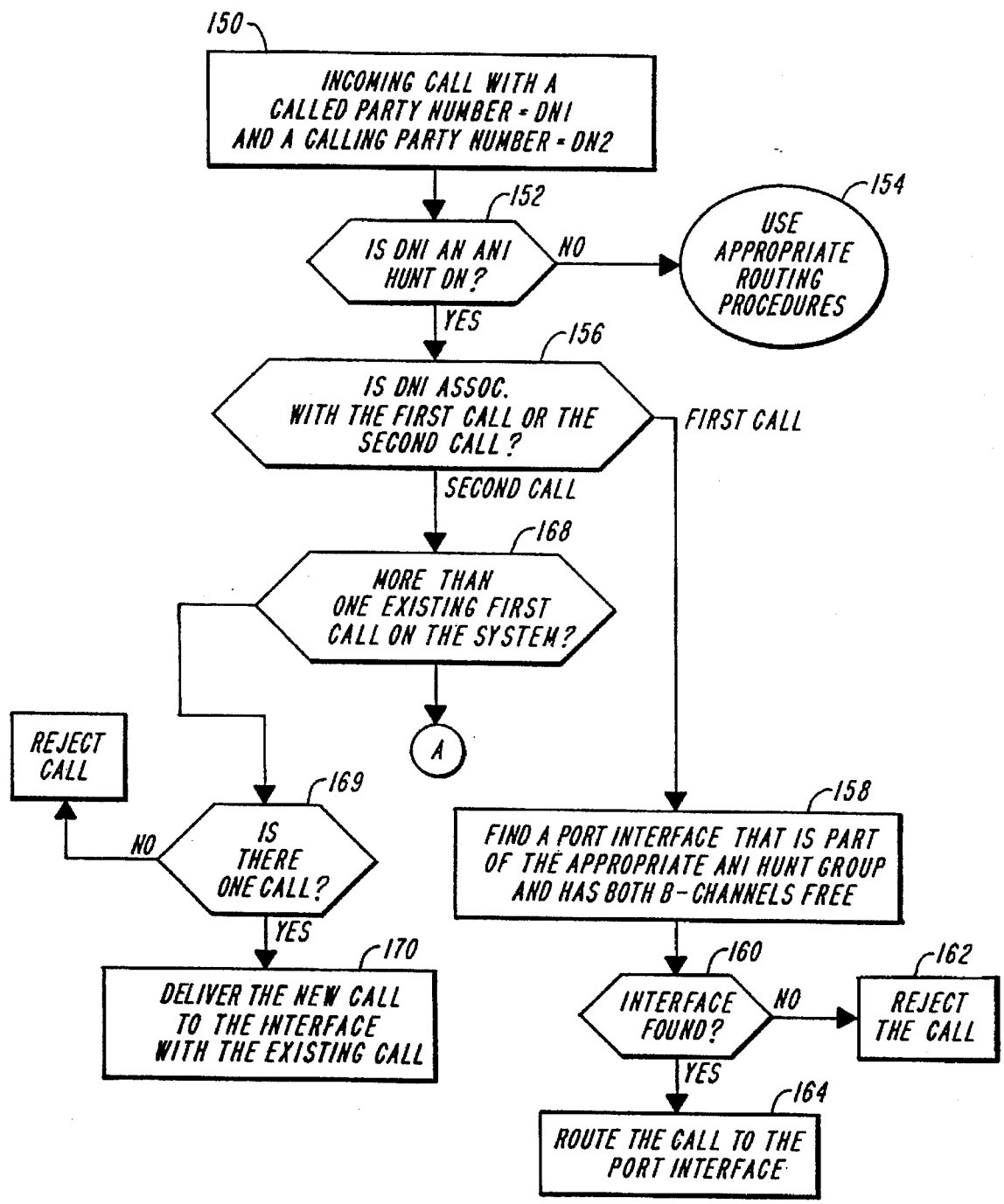
FIGS. 5–7 are flow charts illustrating a routing process according to a second embodiment of the present invention.

Referring to FIG. 5, two different numbers are used as called directory numbers for video calls, such that the first directory number is the first number dialed by the desktop system, and the second directory number is the second number dialed by the desktop system, e.g., 800-UPDATE1 and 800-UPDATE2. In addition to the information about whether a directory number is an individual, in a regular hunt group, or an ANI hunt group, table 48 (FIG. 2) stores information that indicates which called directory number is for a first call and which number is for a second call. (While "800" numbers are used in this and other examples, in practice, a telephone company typically translates the 800 number to a "regular number" and delivers that regular number to the access switch. Thus, the regular number is actually the called directory number DN1.)

When the access switch receives a call, after determining that directory number DN1 is an ANI Hunt Directory Number (steps 150–154), the CPU checks table 48 to determine whether DN1 is a first call directory number or a second call directory number. If the received call is made to a first call directory number, the access switch routes the call to a port interface that is idle, i.e., one in which both B-channels are free (step 158). If no interface is idle (step 160), the access switch rejects the received call (step 162). Otherwise, the call is routed to a next port interface with both B-channels free (step 164), either a next interface in a queue, or a next interface in priority depending on which interface has been idle the longest.

If the received call is to the second call directory number, the access switch assumes that a first call from the originating calling station has already been delivered to an interface. The access switch then tries to deliver the second call to an appropriate receiving station. The switch first determines whether there is more than one existing first call (step 168). If there is not, the switch determines whether there is one (as opposed to none) existing first call that is awaiting a second call (step 169); if there is one call, the access switch delivers the new call to the interface with the first call (step 170). Otherwise, if there is no call, the newly received call is rejected.

Figure 6:
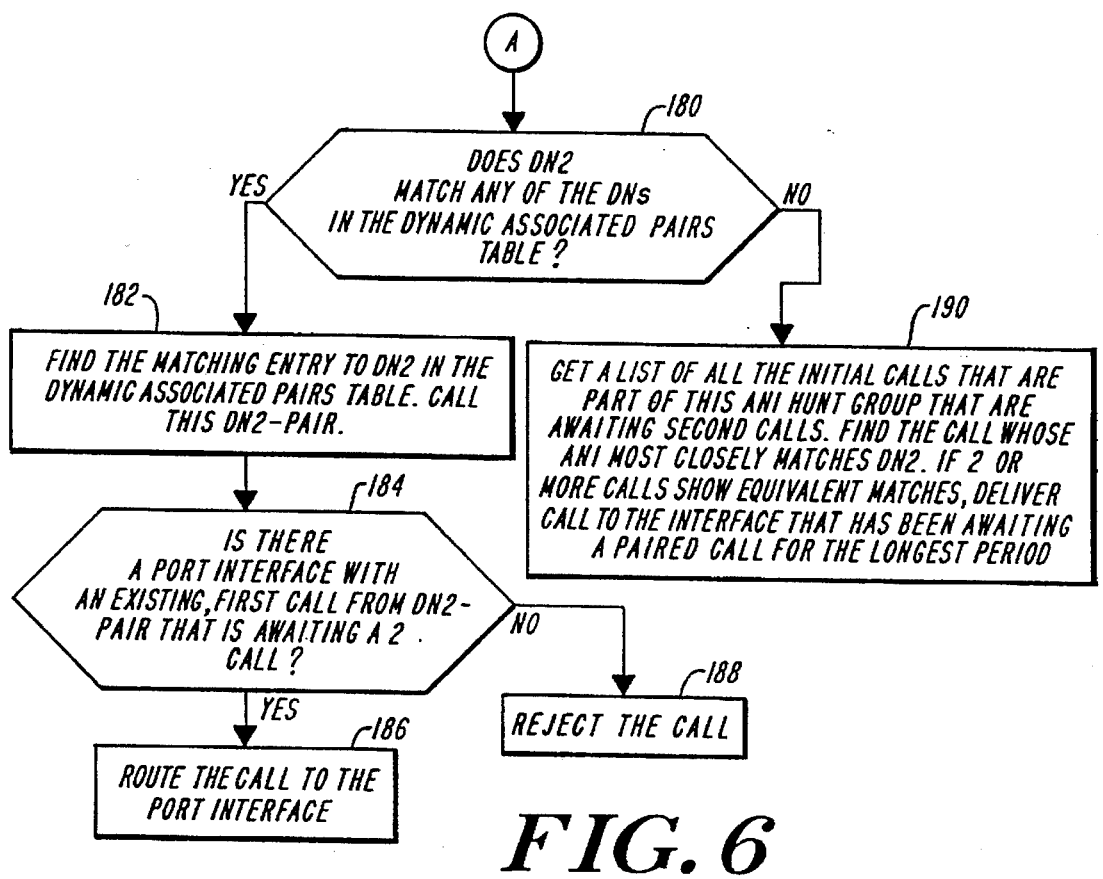

Referring to FIG. 6, if there are several existing first calls that are awaiting second calls, the access switch routes the newly received call to one of the interfaces that already has a first call. To determine which interface, the switch first checks a dynamic ANI pair table, to determine if the ANI of the received call matches any of the ANI's in this table (step 180). If the ANI of the received call matches the ANI in the dynamic ANI pair table, the access switch finds a matching entry (step 182) and then checks for an existing call with an ANI of the matching entry that is awaiting a second call (step 184). If such a call is found, and if the interface to which that call was delivered still has a free B-channel, the received call is routed to the same interface (step 186). Otherwise, the received call is rejected (step 188).

If the ANI in the received call does not match any ANI in the table, the access switch attempts to route the call to an interface for a receiving station that has an existing call with an ANI that best matches the ANI in the received call. For numbers in North America, for example, this can mean that a check is first made on the area code, followed by a check of the exchange ID, followed by a check on the extension. The received call is then routed to the interface with an existing call having an ANI with the best match to the ANI of the received call. The system may route any best match, or may require some tolerance, e.g., only the last four digits can be different; in this case, if no existing call within the tolerance is connected, the call is rejected. If two or more interfaces have equivalent matches, the received call is delivered to the interface among the group of interfaces with equivalently matching first calls that has been waiting the longest period of time for a paired call (step 190).

Figure 7:
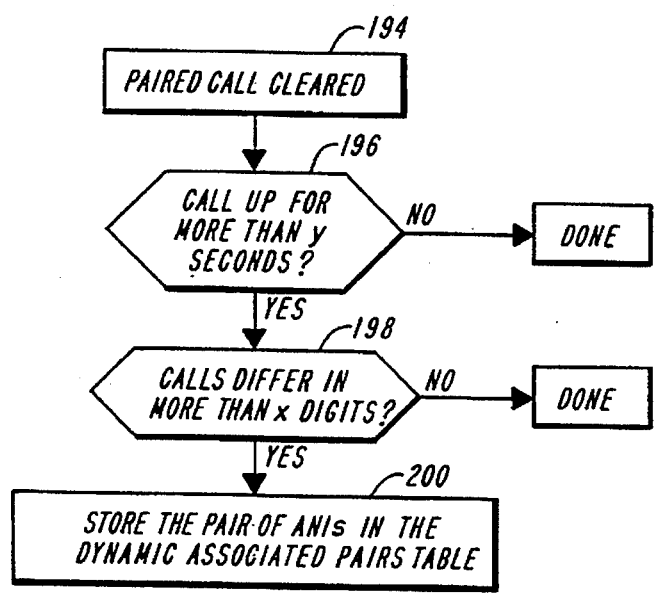

Referring to FIG. 7, if no numerical threshold is set for making the best match, the success of the best match can be assessed after the fact, and successful matches can be used, if desired, to build a dynamic ANI pair table of relatively less likely matches through learning. During times of low traffic, the access switch is more likely to pair calls that are more different, especially on a second call with only one first call. At times of higher traffic, pairing of these calls with a best match is less likely, even if the matching is correct. These less likely matches that are proven successful can be stored for later use, while closer matches are paired based on their closeness. It is assumed that if a best match fails, the parties to the call will likely terminate quickly because the image and voice will be incomprehensible; and that if the best match connection is successful, there will be conversation for some period of time.

As paired calls to interfaces are cleared (also known as disconnected or "torn down") (step 194), the access switch determines whether the call had "been up" (i.e., synchronized correctly) for more than y seconds (step 196). The access switch compares the ANI's of the two calls to determine if the ANI's differ in more than x digits (step 198). If they differ by more than x digits, the switch stores the two ANI's in its dynamic ANI pair table (step 200). This table, which is automatically setup by the system, is thus built by learning and does not need to be configured, although some known entries, if known, can be entered in advance. The values of x and y can be entered and altered by an administrator. If the call was not up for long enough, the numbers are not entered in the table.

Instead of requiring that the ANI's be sufficiently different, a table can be built for ANI's that are close enough within a certain tolerance. If a tolerance is initially required to make a best match, the post-call tolerance can be made more stringent. Accordingly, making the best match in the first instance is relatively lenient, but the post-clearing check (step 198) is determined more strictly because it involves storing the information. Such table-building risks making the table unnecessarily large with obvious pairings. To avoid excessive storage, such a system can be limited to lower volume directory numbers.

In this embodiment, as in others below, an associated pairs table can be used but is not necessary; rather, pairing can be made only through a comparison of the calling directory numbers.

Figure 8:
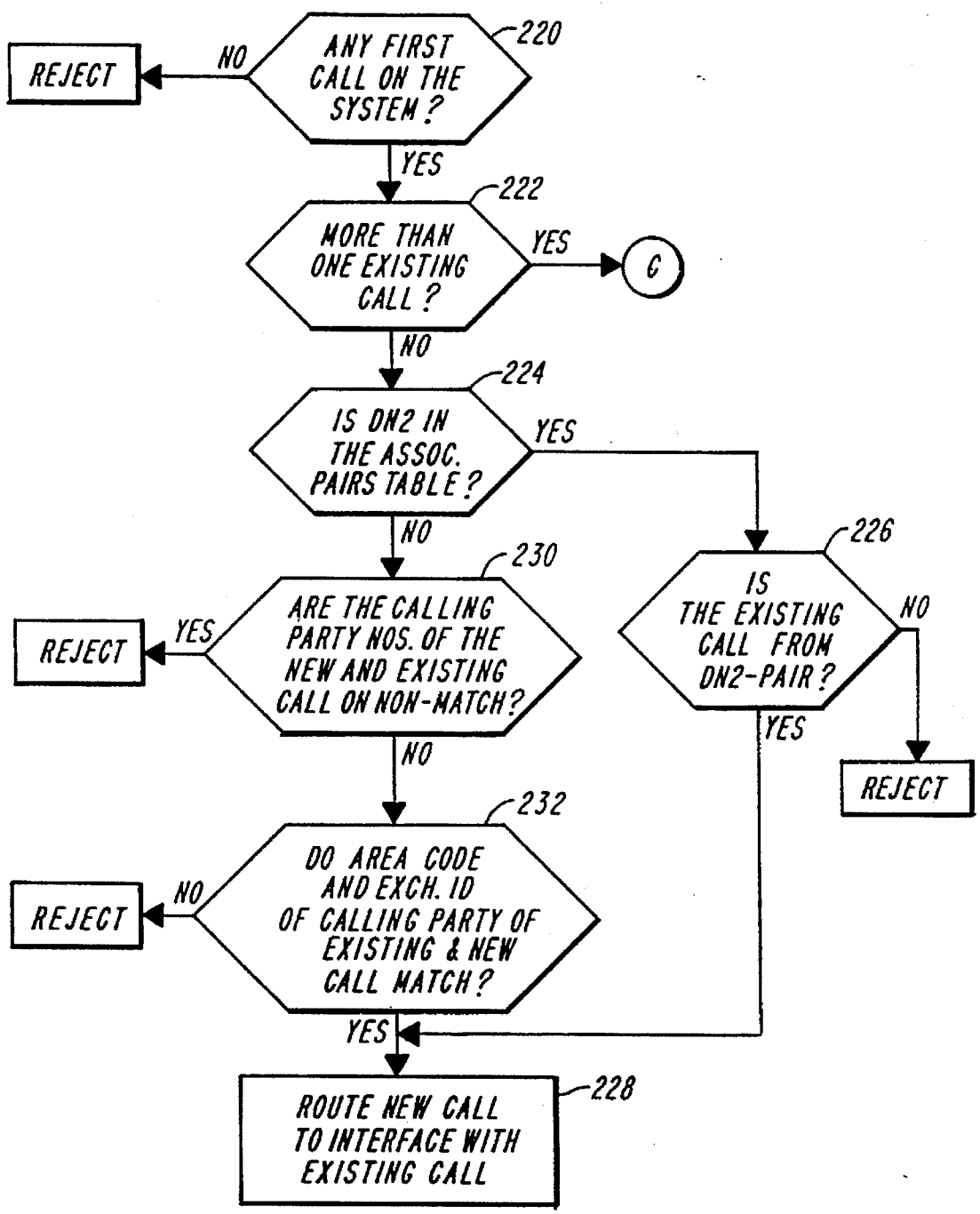
FIG. 8 is a flow chart illustrating a routing process according to a third embodiment of the present invention.

In a third embodiment, the process is generally similar to that of FIGS. 5–7, but with modifications as indicated in FIG. 8. In this embodiment, the steps illustrated in FIG. 8 replace steps 168–170 in FIG. 5. After it is determined that called directory number DN1 is an ANI Hunt DN and that DN1 is a second call, the access switch determines if there is a first call on the system (step 220), and if so, whether there is one call or more than one call (step 222). If there is only one call, the access switch determines whether calling director number DN2 is in an associated pairs table (step 224). If the one existing call is in the associated pairs table, and if the existing call is from DN2-pair (step 226), the received call is routed to the interface through which the existing call is already routed (step 228).

If it is determined that calling directory number DN2 is not in the associated pairs table (step 224), the access switch checks for DN2 on a non-match table (step 230) (the building of the non-match table is discussed below in more detail). If not in the non-match table, the access switch determines whether the identification numbers of the received call and the existing call are sufficiently similar. In a preferred embodiment, this determination is based on whether the area codes and the exchange ID's match (step 232). If they do match, the new, received call is routed to the interface with the existing call (step 228). In this process, contrary responses at steps 220, 226, 228, 230, and 232 result in the call being rejected.

If there is more than one existing call (see step 222), the system proceeds to a sequence C of steps that is similar to the sequence of steps illustrated in FIG. 6. The exception to the similarity is that step 190 of FIG. 6 is altered so that, rather than any closest call, only those calls with matching area codes and exchange ID's are even considered.

The process that is employed after the paired calls are cleared is similar to that in FIG. 7, except that if the call is not up for more than y seconds, rather than just being "done," the access switch can further build a non-match table. The purpose of the non-match table is to store numbers that are close enough to be mistakenly assumed to be from the same calling station, i.e., false positives. Accordingly, if the numbers are sufficiently similar, e.g., the area code and exchange ID are the same, but the call does not stay up more than y seconds, the numbers can be stored, if desired, in the non-match table. This table can then be consulted in step 230 (FIG. 8), and in step 250 (FIG. 9 below), to prevent such false matching.

In a fourth embodiment that has elements of the processes illustrated in FIGS. 3–4 and FIGS. 5–7, and in which one incoming directory number is used for both first and second calls, the access switch first tries to associate calls using an ANI pair table as in steps 100–118 illustrated in FIGS. 3. If the ANI of a new call is not in the table, calls are paired in the order in which they are received. Such pairing is checked after the calls are cleared in a manner similar to the steps illustrated in FIG. 7. When the calls are cleared, pairs of calls that have been up for more than y seconds have their respective ANI's entered in the dynamic ANI table. In this embodiment, no best matching or comparison is required. This process assumes that calls rarely collide, and that if calls do collide, the process assumes that users take varying amounts of time to retry.

Figure 9:
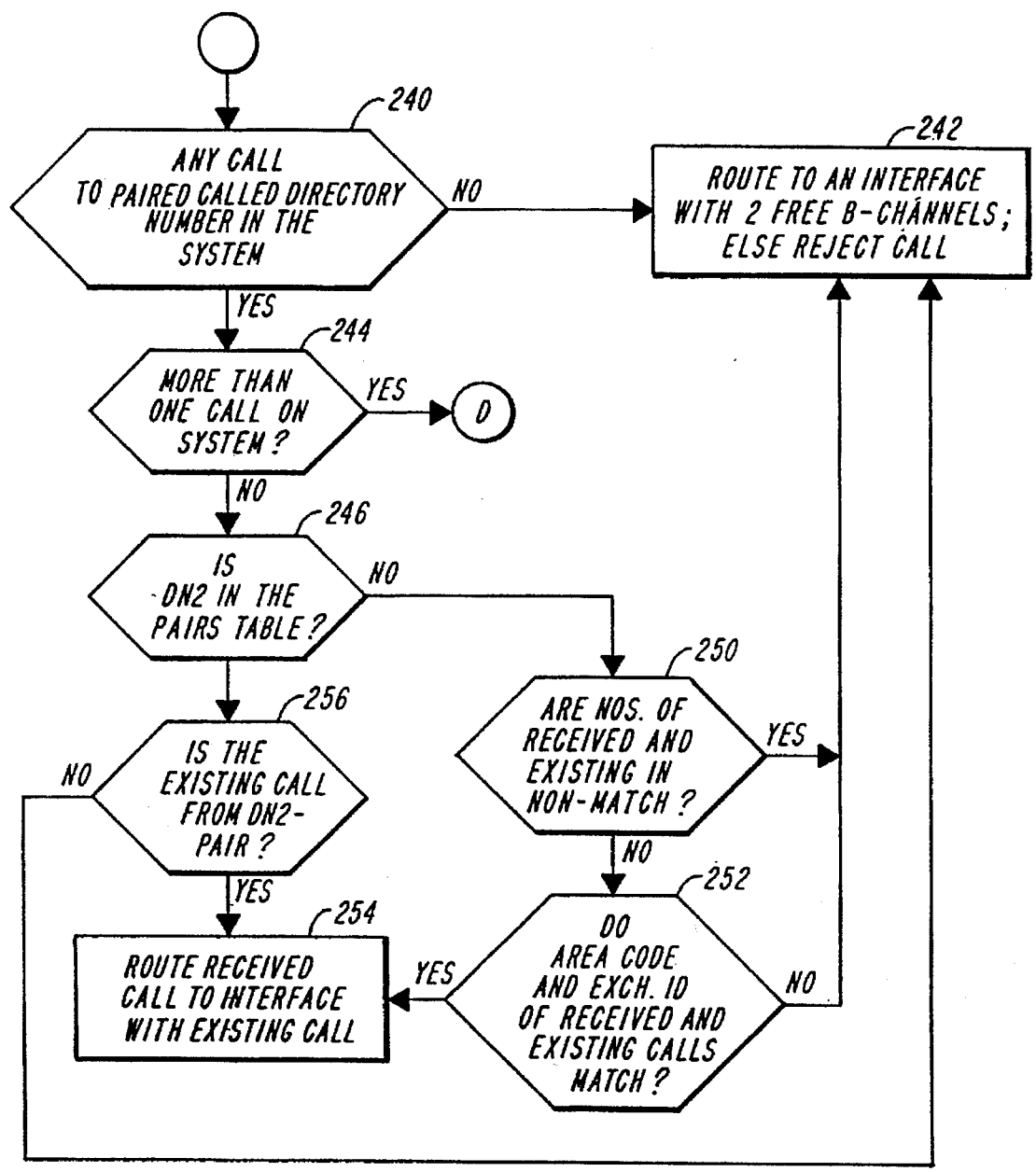
FIGS. 9 and 10 are flow charts illustrating a routing process according to a fifth embodiment of the present invention.
Figure 10:
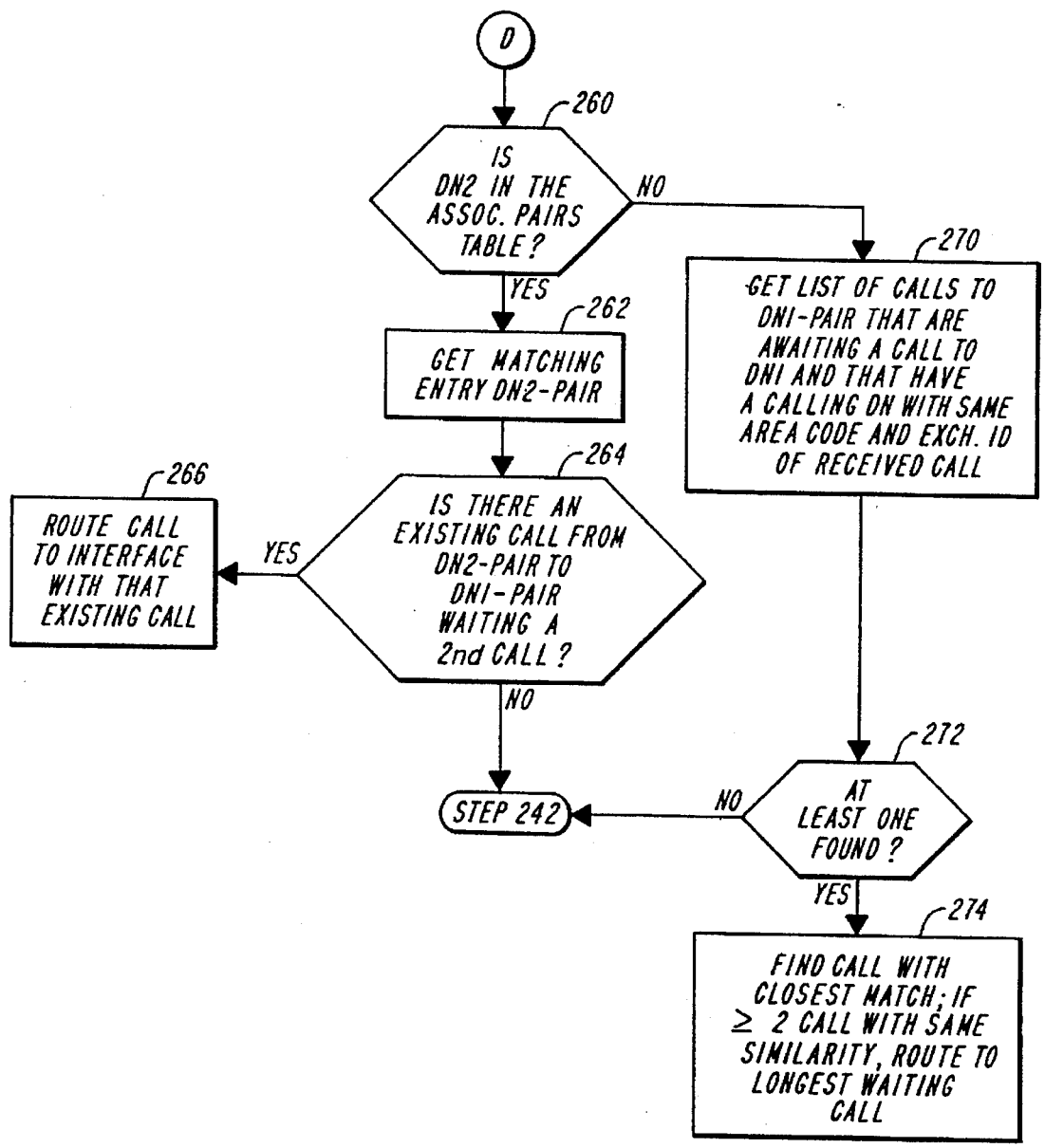

In a fifth embodiment, referring to FIGS. 9–10, calls can be received in an arbitrary order unlike the second and third embodiments in which it is generally assumed that a first call is identified as such and is received and routed before a second call is received.

Referring to FIG. 9, after the access switch determines that the called directory number DN1 is for an ANI hunt group (see steps 100–104 in FIG. 3), the access switch determines whether there is an already existing call to paired called directory number DN1-pair (step 240). If not, the newly received call is routed to an interface with two free B-channels (step 242). If the access switch determines that there is a call, but only one call up on the system (step 244), it then determines if calling directory number DN2 is in an associated pairs table (step 246). If DN2 is not in the associated pairs table, the system checks a non-match table (step 250), if not in the table, the access switch compares the calling directory numbers of the existing call and the new call (step 252) in a manner similar to steps 230 and 232 in FIG. 8, i.e., by comparing the area codes and exchange ID's. If the calling number and existing calls are on the non-match table, or if the area code and exchange ID do not match, the new call is routed to an interface with two free B-channels (step 242), i.e., there is no good match. Otherwise, if the received and existing number are close enough and not on a non-match table, the call is routed to the interface with the existing call (step 254).

If calling directory number DN2 is on the pairs table, and if the existing call is from DN2-pair as indicated by the pairs table (step 256), the call is routed to the interface with the existing call, as in step 254. Otherwise, it is assumed that the existing call is from another pair and the received call is routed to an interface with two free B-channels (step 242).

Referring to FIG. 10, if there is more than one call up on the system (see step 244 in FIG. 9), the access switch then checks if the calling directory number DN2 is on an associated pairs table (step 260), and if so, retrieves the matching entry DN2-pair (step 262). The switch then determines whether there is an already existing call from DN2-pair to DN1-pair that is awaiting a call (step 264), where DN1-pair is the other of the two called directory numbers for a video call. If there is such an existing call, the received call is routed to the interface with that existing call (step 266), and thus the two calls are routed together to allow the video call to proceed. If there is no such existing call, the call is routed to an interface with two free B-channels (step 242, FIG. 9).

If DN2 is not on the pairs table, the access switch gets a list of calls to DN1-pair that are awaiting another call to DN1 and that have a calling directory number with the same area code and exchange ID as the received call (step 270). If no such call is found (step 272), the received call is routed to an interface with two free B-channels (step 242). If at least one call is found that has the same area code and exchange ID as the received call, the received call is routed to the interface with the closest match to that existing call (step 274). If there are two or more calls with an equivalent match, the call is routed to the interface that has been waiting the longest.

When the calls are cleared, associated pairs and non-match tables are built as needed, in a manner discussed above in connection with FIG. 7, as modified to provide a non-match table.

As in other embodiments discussed above, the principles can be extended to multiple calls greater than two. Moreover, associated pairs and non-match tables can be omitted; if they are omitted, the matches are made only by comparisons of directory numbers.

The voice and video can be strictly separated over the two channels, but preferably each channel carries a data signal combining voice and video. The access switch preferably has means for distinguishing data calls (including video calls) from voice-only calls. Data calls are handled as described above, while voice-only calls are routed like regular hunt directory numbers.

Having described embodiments of the present invention, it should be apparent that other modifications can be made without departing from the scope of the invention as defined by the appended claims. As noted above, the principles of the present invention need not be used exclusively with desktop videoconferencing or in the customer service context, although that is the context where the problems of collision are otherwise more prevalent. In addition, while the present system has been described as using two calls over two channels from three calling stations to three receiving stations, the principles can be extending to any plurality of calls, calling stations, and receiving stations. The access switch has been shown and described, particularly in FIG. 2, in terms of general functions; the precise components can be varied, components may be grouped in single individual components, or some components can be divided into separate individual components. The terms "first" and "second" for calls generally refer to two different calls, not necessarily required in that order, unless it is apparent that such a sequence is required as in the process of FIGS. 5–6.

What is claimed is:

1. A method for routing calls in a system having a plurality of calling stations for calling a plurality of receiving stations over a switched network, wherein a calling station communicates with a receiving station through first and second calls connected at the same time, the method implemented by a switching system that routes calls from the switched network to the receiving stations, the method comprising the steps of:

(a) receiving a call originating from a calling station;

(b) determining whether there is an existing call currently connected from the calling station to a receiving station;

(c) if it is determined in step (b) that an existing call from the calling station is currently connected to a receiving station, routing the received call to the receiving station such that the received call and the existing call are thereby connected to the receiving station at the same time; and (d) if it is determined in step (b) that no existing call from the calling station is currently connected to any one of the receiving stations, routing the received call to a receiving station that does not already have an existing call.

2. The method of claim 1, each calling station having a first and second identification number corresponding to a respective channel, step (a) including receiving one of the first and second identification numbers.

3. The method of claim 2, wherein, for at least some of the calling stations, the first and second identification numbers are different from each other, and wherein the switching system includes a first table, step (b) including a step of checking the first table to determine the other of the first and second identification numbers based on the received identification number.

4. The method of claim 3, wherein the switching system includes a second table relating the identification numbers of existing calls and the receiving stations to which such existing calls are connected, step (b) further including the step of checking the second table with the other of the first and second identification numbers to determine if a call with that other identification number has been routed in an existing call to a receiving station.

5. The method of claim 2, wherein, for at least one of the calling stations, the first and second identification numbers are identical, step (b) including determining whether an existing call having the identical identification numbers was routed to one of the receiving stations.

6. The method of claim 2, wherein step (b) includes determining whether the existing call has an identification number that is sufficiently similar within a defined threshold to the one of the first and second identification numbers of the received call.

7. The method of claim 6, further including a step of:

(e) storing in a table the one of the first and second identification numbers for the received call and the identification number for the existing call such that accessing one of the stored first and second identification numbers retrieves the other of the first and second identification numbers.

8. The method of claim 7, wherein step (e) is performed after it has been determined that the received call and the existing call have been connected for a period of time exceeding a threshold.

9. The method of claim 1, wherein the switching system receives calls made to different called directory numbers, the method further including the following steps after step (a) and before step (b):

(a1) determining from the called directory number whether to use a calling directory number when routing the received call; and (a2) if it is determined that the calling directory number is to be used, proceeding to steps (b)–(d).

10. The method of claim 9, wherein step (a1) is performed by consulting a table having a list of called directory numbers and an associated list of routing methods.

11. The method of claim 1, further comprising the steps of:

(e) receiving another call from a different calling station;

(f) using a called directory number to determine whether steps (b)–(d) should be repeated for the call received in step (e); and (g) routing the call to a particular receiving station associated with the called directory number without repeating steps (b)–(d).

12. A method for use in a system having a plurality of calling stations for calling a plurality of receiving stations over a switched network, wherein a calling station communicates with a receiving station through first and second calls connected at the same time, the method implemented by a switching system that routes calls from the switched network to the receiving stations, the method comprising the steps of:

(a) receiving a first call having a first identification number;

(b) receiving a second call having a second identification number;

(c) routing the first and second calls to a receiving station so that the first and second calls are connected to the receiving station at the same time;

(d) determining whether the first and second calls were received from the same calling station; and (e) storing the first and second identification numbers in a storage element for future access in response to the determination in step (d), the storing being done such that the second identification number and the first identification number are linked so that by accessing the storage element with one of the first and second identification numbers, the other of the first and second identification numbers is retrieved.

13. The method of claim 12, wherein step (d) includes determining whether the first and second identification numbers are different within a certain threshold.

14. The method of claim 12, wherein step (d) includes determining whether the first and second calls are both connected to the receiving station for a minimum period of time.

15. The method of claim 12, wherein step (d) includes determining whether the first and second identification numbers are sufficiently close within a tolerance.

16. The method of claim 15, wherein the tolerance is based on a number of identical and different digits.

17. The method of claim 15, wherein step (d) includes determining whether the first and second calls are both connected to the receiving station for a minimum period of time.

18. The method of claim 12, wherein step (d) is performed after both the first and second calls are cleared.

19. The method of claim 12, further comprising the steps of:
(f) receiving a third call having a third identification number;
(g) accessing the storage element with the third identification number to obtain a fourth identification number;
(h) determining whether an existing fourth call with the fourth identification number is already connected to a receiving station; and
(i) routing the third call to the receiving station that the existing fourth call is connected to in response to a determination in step (h) that an existing fourth call has been routed.

20. The method of claim 12, further comprising the steps of:
(f) receiving a third call having a third identification number;
(g) accessing the storage element with the third identification number to obtain a fourth identification number;
(h) determining whether an existing fourth call with the fourth identification number is already connected to a receiving station; and
(i) routing the third call to a currently idle receiving station in response to a determination in step (h) that an existing fourth call has not been routed.

21. A receiver for receiving calls from a plurality of calling stations over a network in a system, transmissions between the calling stations and receiving stations being made through first and second calls at the same time, the receiver comprising:
a plurality of receiving stations; and
a switching system for receiving calls from the network and for routing the calls to the receiving stations, the switching system including:
a processor, responsive to a received call from a calling station, for determining whether there is an existing call from the calling station currently connected to a receiving station, and
a switch, controlled by the processor, for routing the received call to the same receiving station as the existing call in response to a determination that the existing call from that calling station is currently connected to a certain receiving station, and for routing the received call to an idle receiving station in response to a determination that a no existing call from the calling station is currently connected to any receiving station.

22. The receiver of claim 21, the switching system further including a storage element for storing a first table of information accessible by the processor, each call including an identification number indicating a channel, the identification numbers for at least some of the channels being stored in the first table, each calling station having associated identification numbers corresponding to respective first and second calls from the same calling station.

23. The receiver of claim 22, the processor including:
means for accessing the first table with an identification number of the received call to obtain an associated identification number, and
means for determining whether an existing call has the associated identification number.

24. The receiver of claim 21, the processor including:
means for comparing an identification number for the received call and identification numbers for existing calls,
the switch routing the received call to the receiving station that has an existing call with an identification number that is most similar to the identification number of the received call.

25. The receiver of claim 21, the processor including:
means for determining whether first and second calls are connected for a minimum threshold time, and
means for storing first and second identification numbers corresponding to respective first and second calls so that a second identification number can be determined from the first identification number,
the storing means being responsive to determining means determining that the first and second calls are connected for at least the minimum threshold time.

26. In a system having a plurality of calling stations for calling, over a switched network, a receiver having a plurality of receiving stations wherein a calling station communicates with a receiving station through first and second calls at the same time, a switching system for the receiver comprising:
means for routing first and second calls to a receiving station;
a processor for determining whether the first and second routed calls originated with the same calling station after the calls have already been routed; and
a storage element, coupled to the processor, for storing the first and second identification numbers in response to the determination by the processor, the storing being done such that the second identification number and the first identification number are linked so that by accessing the storage element with one of the first and second identification numbers, the other of the first and second identification numbers is retrieved.

27. The switching system of claim 26, wherein the processor has means for determining whether the first and second calls are both connected for a minimum period of time.

28. The switching system of claim 26, wherein the processor has means for determining whether the first and second identification numbers are similar within a certain tolerance.

29. The switching system of claim 26, wherein the processor has means for determining whether the first and second identification numbers are different within a certain tolerance.

* * * * *